Figure 1:
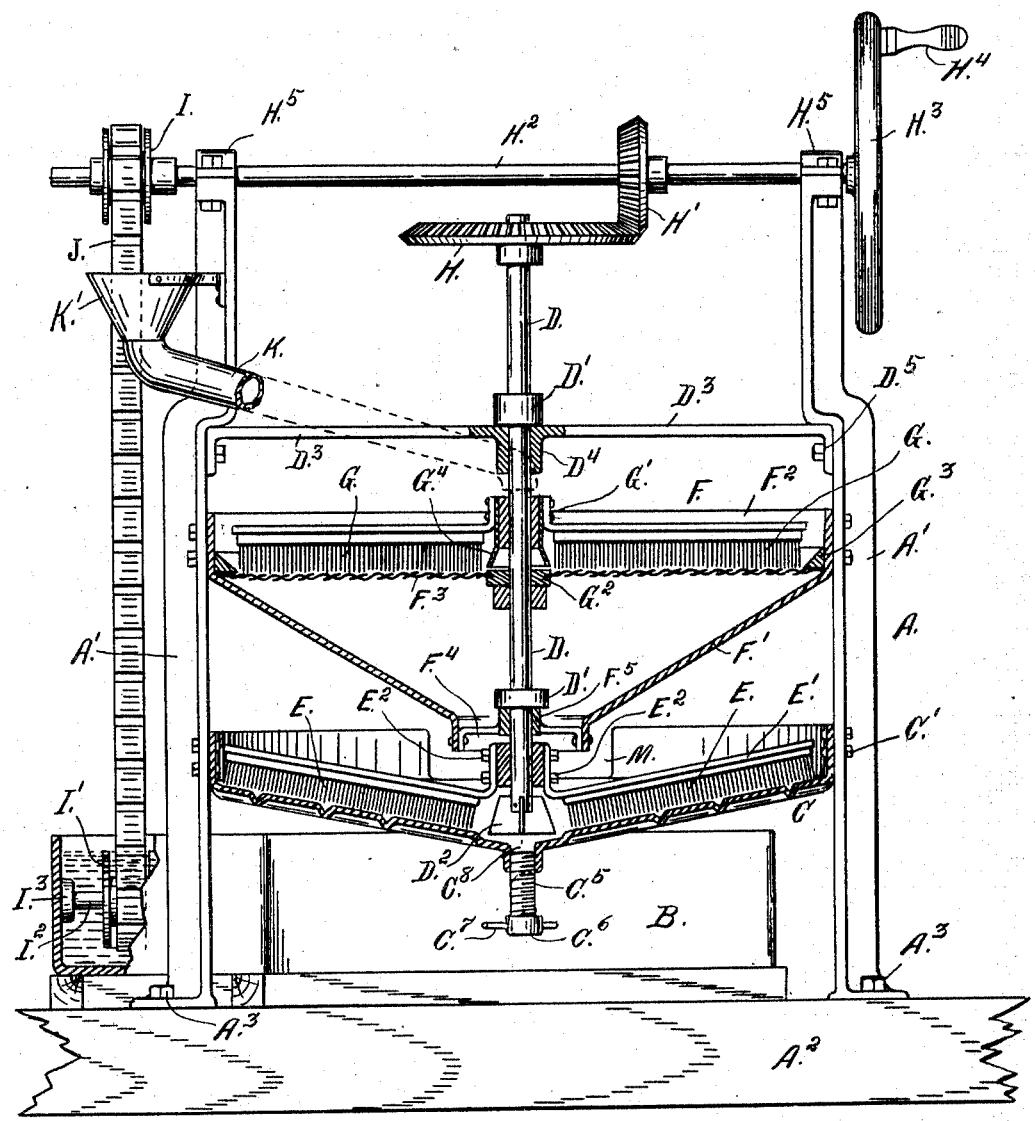

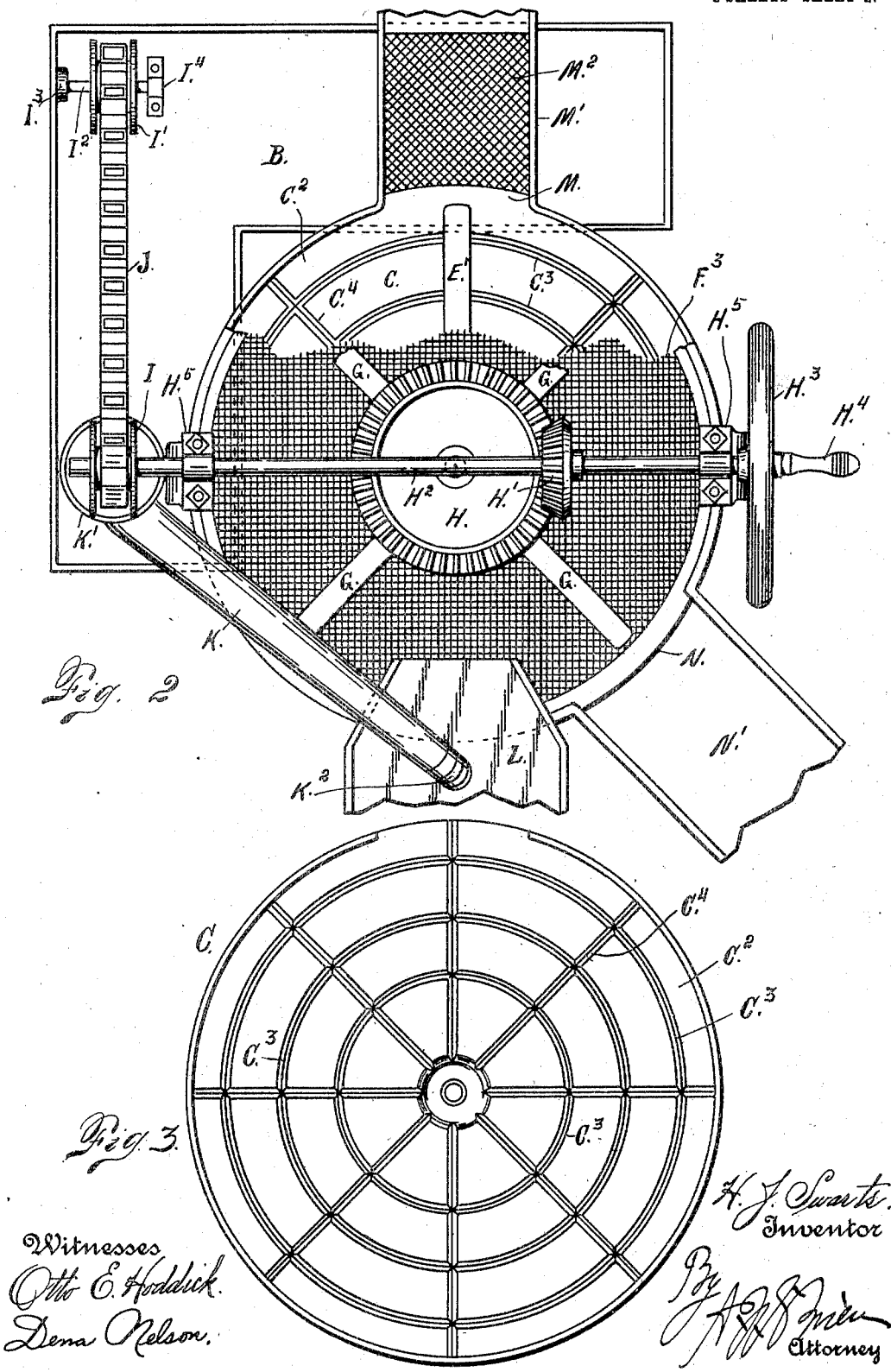

No. 788,737. Patented May 2, 1905.

UNITED STATES PATENT OFFICE.

HENRY J. SWARTS, OF DENVER, COLORADO, ASSIGNOR TO THE SWARTS MANUFACTURING & MINING COMPANY, OF DENVER, COLORADO, A CORPORATION.

PLACER-MACHINE.

SPECIFICATION forming part of Letters Patent No. 788,737, dated May 2, 1905.

Application filed March 18, 1904. Serial No. 198,816.

*To all whom it may concern:*

Be it known that I, HENRY J. SWARTS, a citizen of the United States of America, residing in the city and county of Denver and State of Colorado, have invented certain new and useful Improvements in Placer-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in apparatus more especially intended for use in separating and saving the free precious-metal values contained in sand, dirt, or other granular or amorphous material as found in its natural state, and while the machine is especially devised and constructed with this end in view it is believed that it may be found useful for general concentrating purposes, and hence it must be understood that its use is not limited exclusively to the treatment of placer material.

The invention, generally speaking, consists of a suitable upright frame upon which are mounted two stationary pans one above the other, the upper pan being provided with a funnel-shaped bottom, above which is located a false bottom composed of mesh material, as wire screen, whereby the finer material is separated from the coarser. The fine material after passing through the screen falls to the funnel-shaped bottom of the upper pan and passes thence through a central opening therein to the lower pan, where the values are separated from the gangue or worthless material. The bottom of this last-named pan is provided with circular grooves and also radial grooves, which intersect the circular grooves and terminate in a pocket or receptacle connected with the center of the bottom of the pan. This separating-pan is provided with a conical bottom, which is highest at its outer edge and slopes downwardly to the central pocket, adapted to contain the values or concentrates. Mounted above the bottom of each pan and cooperating therewith are a number of brushes, which are connected with a centrally-located rotating shaft, whereby the brushes are made to travel in the pans at any desired speed that may be required for the proper performance of their function. The brushes may be operated either by hand or other power. The material to be treated is first fed to the upper pan, together with a suitable quantity of water, which is elevated from a tank located below the lower pan or from any other suitable source.

Having briefly outlined my improved construction, as well as the function it is intended to perform, I will proceed to describe the same in detail, reference being made to the accompanying drawings, in which is illustrated an embodiment thereof.

Figure 4:
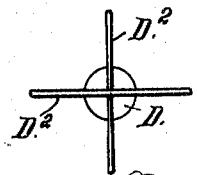

In the drawings, Figure 1 is a central vertical section taken through my improved machine. Fig. 2 is a top or plan view of the same. Fig. 3 is a plan view of the lower pan. Fig. 4 is an underneath view of the rotary shaft, showing the agitating blades or wings on a larger scale than in the other views.

The same reference characters indicate the same parts in all the views.

Let A designate a suitable frame composed of upright bars A', which, as shown in the drawings, are composed of angle-iron. It must be understood, however, that this framework may be composed of any suitable material. The angle-bars A', as shown in the drawings, are mounted on a suitable stationary base or support $A^2$ and are secured thereto by means of bolts $A^3$ or other suitable fastening devices. Mounted on the base $A^2$ is a tank B, adapted to contain a suitable quantity of water for use in connection with the machine. Attached to the lower portion of the upright frame-bars A' by means of suitable fastening devices C' is a tank C, having a tapering or conical bottom $C^2$, provided with parallel circular grooves $C^3$, located at suitable intervals. These circular grooves $C^3$ are intersected at suitable intervals by radial grooves $C^4$, whose lower extremities terminate in a central receptacle $C^8$, which receives the values as they move downwardly and escape from the radial grooves $C^4$. The receptacle $C^8$ is closed by a screw-plug $C^5$, having a head $C^6$, provided with arms $C^7$ for convenience of manipulation.

The lower extremity of a centrally-located shaft D extends into the bottom of the pan C and is provided with agitating-wings $D^2$. To the lower part of this shaft, immediately above the wings, are secured brushes E, which are inclined to correspond with the inclination of the bottom of the pan. To the tops of these brushes are attached bars E', whose inner extremities are bent upwardly and fastened to the shaft by means of bolts $E^2$.

Above the pan C and surrounding the shaft D is a pan F, having a funnel-shaped bottom F' and a cylindrical body portion $F^2$ above. Between the conical bottom and the body of the pan is located what I will term a "false bottom" $F^3$, composed of mesh material, as wire screen, whose perforations or meshes may be of any desired size, depending on the size of the material which it is intended the screen should reject. The funnel-shaped bottom of the pan is provided with an opening $F^4$, and to the shaft D adjacent this opening is applied a loose collar $F^5$, having spider-arms $F^6$, to which is secured the lower extremity of the bottom F', which is turned downwardly at right angles to form a flange. The spider-arms are riveted to this flange or otherwise suitably secured, as indicated in the drawings.

Secured to the shaft D is a ring D', which rests upon the collar $F^5$, whereby the shaft is supported in operative relation with the other mechanism. Mounted in the pan F and occupying a position in the body portion thereof above the screen is a number of brushes G, whose inner extremities are secured to the shaft, as shown at G'. The shaft passes through and rotates in a collar $G^2$, to which the central portion of the screen $F^3$ is attached and whereby the latter is supported. The outer periphery of the screen $F^3$ is attached to a ring $G^3$, secured to the inner wall of the pan immediately above the funnel-shaped bottom. This ring is triangular in cross-section, and its inner face is beveled or inclined, whereby no opportunity is given for the material to lodge or catch thereon. Above the collar $G^2$ and secured to the shaft, occupying the space at the inner extremity of the brushes, is an inverted-funnel-shaped part $G^4$, which directs the material outwardly and prevents it from lodging on the collar $G^2$. The shaft D is further supported by a collar $D^4$, through which the shaft passes and which is supported by radial arms $D^3$, whose outer extremities are secured to the frame-bars, as shown at $D^5$. Immediately above the collar $D^4$ the shaft is provided with a ring D', which rests upon the collar. Hence it will be understood that the shaft is nicely fitted to and journaled in collars $F^5$, $G^2$, and $D^4$. Above the ring D' of the shaft the latter is provided with a beveled gear H, which meshes with a smaller gear H', made fast to a horizontal shaft $H^2$. To one extremity of this shaft, as shown in the drawings, is secured a wheel $H^3$, provided with a crank-handle $H^4$ for operating the machine. This shaft $H^2$ is journaled in the frame-bars A', as shown at $H^5$, and to its extremity remote from the hand-wheel $H^3$ is made fast a pulley I, having vertical flanges for retaining in place the endless carrier J, which is provided with buckets, whereby water is elevated from the tank B and discharged into the upper pan by way of a conduit K, having a funnel-shaped top K' and a lower extremity $K^2$, which discharges into a chute L, mounted at one side of the machine and into which the material to be treated is also delivered, the said material and the water forming a pulp of suitable consistency. Below the pulley I and located below the level of the water in the tank B is another pulley, I', similar to the pulley I, and which also engages the endless elevator or carrier, whereby the latter is held in operative relation with the other parts of the mechanism. The pulley I' is mounted on a short shaft $I^2$, suitably journaled in bearings $I^3$ and $I^4$, located in the tank B.

When the machine is in operation, the gangue is discharged from the lower pan E through on opening M, formed in the body portion thereof on a level with the upper extremity of the conical bottom. Registering with this opening M is a chute M', whose bottom is composed of wire-mesh material $M^2$, whereby the water is drained from the gangue as it is discharged from the machine and passes back into the tank B, since the screen bottom $M^2$ of the chute is located directly above the tank. The coarse material which is rejected by the screen $F^3$ of the upper pan is discharged through an opening N, formed in the cylindrical part of the pan on a level with the screen. Leading from this opening N is a chute N', which may be carried to any desired distance in order to throw the coarser portion of the gangue as far from the machine as desired.

From the foregoing description the use and operation of my improved apparatus will be readily understood. The material to be treated is fed to the chute L, which is inclined downwardly toward the pan F, and simultaneously with the delivery of the material to this chute the shaft $H^2$ is rotated, whereby water is elevated and discharged into the conduit K and passes thence to the chute L, forming a pulp with the said material and carrying the same into the pan F. This material falls on the screen or false bottom $F^3$ and is carried around thereon by the rotated brushes G. The coarse material which is rejected by the screen is carried outwardly by the brushes and discharged through the opening N into the chute N', as heretofore explained. The finer material, containing the values which it is the function of the machine to save, pass through the screen $F^3$ and falling upon the funnel-shaped bottom F' of the pan pass downwardly through the opening F⁴ into the central portion of the bottom pan C, where it is acted on by the brushes E, which rotate with the shaft D, as aforesaid. This action of the brushes on the material under treatment causes the values to settle in the circular grooves, and as they are carried around by the brushes they enter the radial grooves formed in the bottom of the pan C and pass thence downwardly into the receptacle C⁸ for the values and may be removed by unscrewing the plug C⁵, as heretofore explained. The blades D² act on the material which otherwise would lodge in the center of the pan at the inner extremities of the brushes and work or force this material outwardly, so that the brushes can get action on it in order to separate the values therefrom. The brushes by virtue of their rotary action impart to the pulp in the concentrating-pan C a circular movement corresponding with the speed with which the brushes are rotated. The centrifugal force due to this circular movement of the pulp carries the latter outwardly from the center of the pan into which it is fed. By virtue of this construction and arrangement the material to be treated is carried from the center to the outer edge of the pan, where the gangue is discharged, and during this operation the pulp is deprived of its valuable particles, which are caught in the grooves of the pan C and passed downwardly to its center and lodged in the receptacle for the concentrates.

Having thus described my invention, what I claim is—

1. In a placer-machine or concentrator, the combination with a suitable supporting-frame, of two stationary pans one mounted above the other, the lower pan having a conical bottom and provided with circular and intersecting radial grooves whereby the values or concentrates are directed downwardly to the center of the pan which is lowermost, the upper pan being provided with a screen adapted to reject the coarser portion of the material under treatment, brushes revolubly mounted in operative relation with each pan, the brushes of the lower pan being inclined to conform with the inclination of the pan's bottom and adapted to act on the material thereon, and the brushes of the upper pan being arranged above the screen and acting on the material thereon, and suitable means for rotating the two sets of brushes.

2. In an apparatus of the class described, the combination of a suitable upright frame, and two pans made fast thereto and arranged one above the other, the lower pan having a conical bottom provided with radial grooves, and the upper pan having a funnel-shaped bottom with an opening in the center whereby the material under treatment is delivered from the upper pan to the central and lowest portion of the lower pan, the upper pan having a horizontally-arranged false bottom composed of mesh material located above the funnel-shaped bottom, a centrally-located shaft, two sets of brushes attached to the said shaft and coöperating respectively with the two pans, the one set of brushes acting on the material on the bottom of the lower pan, and the other set of brushes acting on the material engaging the screen of the upper pan, and suitable means for imparting the rotary movement to the shaft.

3. The combination with a suitable upright frame, of two pans made fast to the frame one being located above the other, the lower pan having a conical bottom provided with circular and radial intersecting grooves and a cylindrical body part extending above the bottom, the outer edge of the pan's bottom being highest and its central portion lowest, brushes revolubly mounted to act on the material resting on the bottom of the pan, a vertical shaft with which said brushes are connected, and suitable means for feeding the material to be treated to the pan.

4. The combination with a suitable upright frame, of a concentrating-pan secured to the lower portion of the frame, and having a conical bottom provided with circular and radial intersecting grooves, and a pan mounted above the concentrating-pan and provided with a horizontally-disposed screen, and a funnel-shaped bottom located below the screen and having a central opening to deliver the material to be treated to the central portion of the concentrating-pan, brushes mounted above the screen of the said pan, a vertical shaft with which said brushes are connected, suitable means for rotating the shaft, and brushes located in the concentrating-pan and also connected with the said shaft.

5. In a machine of the class described, the combination with a suitable frame, of a horizontally-disposed concentrating-pan secured to the frame and having a conical bottom which is highest at its outer edge and slopes gradually downwardly to the center which is lowermost, the said bottom being provided with circular and radial intersecting grooves, brushes mounted in the pan, and a vertical shaft revolubly mounted, to which said brushes are connected, and suitable means for delivering the material to be treated to the said pan.

6. The combination with a suitable frame, of a stationary concentrating-pan provided with a conical bottom having circular and radial intersecting grooves, brushes revolubly mounted in the pan, a vertical shaft revolubly mounted with which said brushes are connected, and a separating-pan mounted above the concentrating-pan and having a funnel-shaped bottom provided with a central opening surrounding the vertical shaft, the said pan being also provided with a horizontally-disposed mesh bottom located above the funnel-shaped bottom, and radially-disposed brushes secured to the said shaft and adapted to act on the material fed to the screen.

7. The combination in a machine of the class described, of an upright frame having a conical bottom provided with circular and radial intersecting grooves, a concentrating-pan secured to the frame, a separating-pan mounted above the concentrating-pan and having an opening to permit the discharge of material to the latter, each pan having a set of radially-disposed brushes, a vertical shaft with which the said brushes are connected, means for rotating the shaft, means for feeding the material to be treated to the upper pan, and means for simultaneously delivering to the upper pan the necessary water for use in connection with the material under treatment.

8. The combination with a suitable frame, of two stationary pans one arranged above the other, the lower pan having a conical bottom highest at its outer edge, and a cylindrical rim located above the bottom, the said rim having an opening for the escape of the gangue, radially-disposed brushes located in the said pan, a vertical shaft with which said brushes are connected, the lower extremity of the shaft being provided with radial wings occupying the central space at the inner extremities of the said brushes, a separating-pan located above the concentrating-pan and having a horizontally-disposed false bottom composed of mesh material surrounding the said shaft, the separating-pan being provided with a funnel-shaped bottom having a central opening whereby the material is discharged to the concentrating-pan, radial, horizontally-disposed brushes located in the separating-pan and secured at their inner extremities to the vertical shaft, and an inverted-funnel-shaped collar connected with the shaft and occupying a central position at the inner extremities of the said brushes.

9. The combination with a suitable frame, of two pans mounted thereon one being located above the other, the lower pan being a concentrating-pan and the other pan a separating-pan and provided with a horizontally-disposed screen located above the true bottom of the pan which is funnel-shaped and having an opening in the center whereby the material is fed to the concentrating-pan below, suitable means for feeding the material under treatment to the separating-pan, a water-tank, an elevator for raising the water from said tank, a conduit which receives the water from the elevator and conducts it to the upper pan simultaneously with the introduction of the material to be treated thereto, the lower pan being provided with a screen-bottomed outlet for the gangue, the said outlet being located above the tank whereby the water is allowed to reënter the tank to prevent waste.

10. In a machine of the class described, the combination with a suitable frame, of a concentrating-pan made fast thereon and having a conical bottom which is highest at its outer edge and tapers downwardly to its central portion, a shaft revolubly mounted in the frame and centrally located with reference to the concentrating-pan, the said shaft having brushes occupying an inclined position to correspond with the inclination of the bottom of the pan and located in suitable proximity thereto, the outer edge of the pan having a flange provided with an opening for the discharge of the gangue, and suitable means for feeding in the first instance all the material to be treated to the central and lowest portion of the pan.

11. In a machine of the class described, the combination with a stationary concentrating-pan having a conical bottom sloping downwardly from its outer edge to its central portion which is lowest, a shaft centrally located with reference to the pan, and radial brushes connected with the shaft and inclined upwardly from the shaft to conform to the inclination of the pan's bottom and in suitable proximity to the latter, and means for delivering in the first instance all the material to the central part of the pan's bottom.

In testimony whereof I affix my signature in presence of two witnesses.

HENRY J. SWARTS.

Witnesses:
A. J. O'BRIEN,
DENA NELSON.